May 11, 1954

E. B. McMILLAN ET AL
CELLULAR RESINOUS MATERIALS AND
PROCESSES OF MAKING THE SAME
Filed Nov. 20, 1948

2,678,293

Inventors
Edward B. McMillan
Arthur R. Olson
By their Attorney
Thomas J. Ryan

Patented May 11, 1954

2,678,293

UNITED STATES PATENT OFFICE 2,678,293

CELLULAR RESINOUS MATERIALS AND PROCESSES OF MAKING THE SAME

Edward B. McMillan, Marblehead, and Arthur R. Olson, Wakefield, Mass., assignors to United Shoe Machinery Corporation, Flemington, N. J., a corporation of New Jersey Application November 20, 1948, Serial No. 61,154

15 Claims. (Cl. 154—54)

This invention relates to a new cellular resinous material and to a new process for molding cellular resinous articles.

Plastic articles have been formed in various shapes by molding liquid resins or resin powder under heat and pressure. Because of the necessity of applying pressure, design of molding equipment particularly for complex shapes is extremely difficult and the equipment is costly. Also molded articles have in general been excessive heavy where the molded material was solid, or have lacked structural strength where hollow constructions are employed.

It is a feature of the present invention to provide a new, strong, light, resinous material and to provide a new method of molding the material using simple molding apparatus.

These and other features are described below and are illustrated in the accompanying drawings, in which.

In accordance with the present invention heat softenable resinous material, preferably of the type which is first softened and then cured or hardened by heat, is compounded with a blowing agent and the compounded material is divided into solid granules. A simple mold such as the two part mold shown in Figs. 1 and 2, or any heat resistant container, is filled with the granules, and the granules are then heated to soften the granules, and to cause the blowing agent to evolve gas. The evolved gas expands the individual solid granules to fill the intergranular spaces and to force the faces of the expanded granules into continuous contact with the surfaces of adjacent granules and with the surfaces of the mold. Where a curing or heat-hardening resinous material is used, heating will be continued to cure or harden the material. The molded article may then be removed from the mold.

Figure 3:
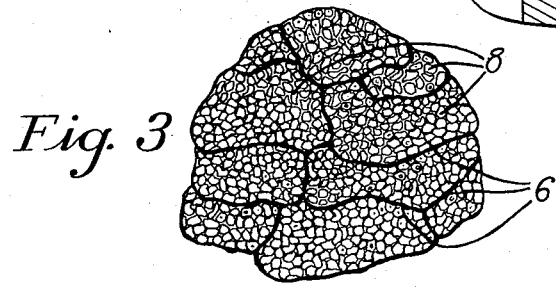
Fig. 3 is a drawing from a photomicrograph of a cut and polished section of the cellular material of the present invention and Fig. 4 is an elevation view of the molded heel part of the last after removal from the mold and trimming of excess material therefrom, and with a last forepart shown in broken lines assembled with the heel part.

The product obtained by the foregoing method possesses unusual strength due to the structure resulting from the expansion and fusing together of the resinous granules. At the area of contact between adjacent expanding granules, the surfaces are fused together so that there results (see Fig. 3) a continuous cellular structure shown as thick lines 6 of substantially non-porous resinous material defining enclosed spaces or cells 8 which are filled with expanded resinous material. The non-porous cellular structure apparently contributes to the mechanical strength of the product. Also the area of fused-together surface between the granules is large and gives a strong integral body which shows no tendency to separate along lines corresponding to junctures between granules in the initial composition. In a preferred form the mold is filled with granules before heating and remains filled during and after the heat treatment there being substantially no overall volume change in the resinous material. In this form the original distribution of resinous material in the molded article is not disturbed. This form is of particular advantage for providing a light, strong, permanent filling between spaced surfaces, for example to fill the hollow interior of metal or other structures or to provide a light core which is bonded by its own adhesive properties to spaced metal or other sheets.

To obtain the unique advantages of the present invention it is important that the resinous material be softened at a temperature below that at which the blowing agent develops substantial blowing pressure to a readily deformable and tacky condition in order that the granules may be shaped under the expansive action of the blowing agent to fill the intergranular spaces and bond with adjacent expanded granules; but that the material become strong and firm when cooled or after curing. As a simple criterion of physical properties which should exist in the heat-softened state, it may be stated that it is desirable that in heat-softened condition the resinous material be sufficiently soft that without the generation of gas within the granules by the blowing agent, the mass of granules will shrink in volume and flow together. It is likewise important that the resinous material in heat-softened condition form films of sufficient strength so that the bubbles do not rupture to form large void spaces within the blown material.

This combination of physical properties may be secured by mixture of a rubber-like material and a heat softenable resin which is strong and rigid in set condition. The need to be heat softenable exists only during the stage of expansion of the individual granules and in the knitting together of the expanded granules during the formation of the new cellular material; and the expression "heat softenable resin which is strong and rigid in set condition" includes resins which are heat softenable at this stage, both those resins which are permanently thermoplastic and those which are softened by heat in the state in which they exist at this stage, but which become infusible after this heating step.

Many resinous compositions may be selected possessing properties making them suitable for use to form the new article according to the method of the present invention.

A resinous material which has been found particularly satisfactory in the manufacture of articles which must be light and strong, such as lasts, comprises from 50 to 75 parts of a heat-hardening phenolic resin and from 50 to 25 parts of a compatible solid plasticizer such as a synthetic rubber, e. g. a butadiene-acrylonitrile copolymer synthetic rubber. A phenolic resin which has been found useful is Durez resin #12687 obtained from the Durez Plastics & Chemicals Co. of North Tonawanda, New York, which is understood to be a condensation of a cashew nut shell oil and another phenol with an aldehyde. This type of resin is described in greater detail in United States Letters Patent to Alvin F. Shepard et al., No. 2,203,206, granted June 4, 1940. Other suitable phenolic resins include Resins 378 and L-9718 obtained from the Monsanto Chemical Co. of St. Louis, Missouri, and Resin 12315 obtained from the General Electric Co. of Schenectady, New York.

Suitable solid plasticizers for the phenolic resin include copolymer rubbers such as Hycar OR-25 and Hycar OR-15 which are understood to contain, respectively, 33% and 45% acrylonitrile and which are obtained from the B. F. Goodrich Company, of Akron, Ohio. Other copolymer rubbers, such as Chemigum N3 and N4 which are obtained from Goodyear Tire and Rubber Company, of Akron, Ohio, various Butaprenes obtained from Firestone Tire and Rubber Co. of Akron, Ohio, and Perbunans obtained from Enjay Co. of New York, N. Y., may be used provided they contain at least 20% acrylonitrile. To obtain the desired plasticizing action of the copolymer on the resinous material there may be employed from 30 to 100 parts of the copolymer to 100 parts of the resinous material.

Other compatible low-melting plasticizers such as a coumarone-indene plasticizer (Piccoumaron 422R) which has a melting point of 75° C. or plasticizer Durez 13698 may be added for the usual purposes.

Other resinous compositions which may be employed according to the present invention to form the new, light, strong, cellular material include intimate mixtures of from 55 to 70% of polyvinyl chloride with from 45 to 30% of butadiene-acrylonitrile copolymers containing from 25 to 45% acrylonitrile, intimate mixtures of resinous high styrene content copolymers of styrene and diolefins with a synthetic rubber such as polychloroprene or rubbery lower styrene content copolymers of styrene and butadiene. The high styrene content copolymers may contain from 60 to 90% styrene. Other resinous compositions or mixtures possessing the properties noted above may be employed according to the present invention.

With the resinous material there is incorporated sufficient blowing agent to maintain the volume of the material and to insure satisfactory molding pressure. A preferred range is from 3 to 20 parts by weight of a blowing agent to 100 parts by weight of the resinous material. Any conventional blowing agent may be used but it has been found that the blowing agents Unicel (diazoaminobenzene) obtained from E. I. Du Pont de Nemours and Company, ammonium bicarbonate or sodium bicarbonate alone or with stearic acid and blowing agent No. 15, understood to be biuret and urea in equimolal proportions, which is obtained from the Sherwin Williams Company, are particularly satisfactory. It has been observed that in compositions including a curing agent such as hexamethylene tetramine which evolves gas during the curing cycle, the conventional blowing agent may be employed in reduced proportion or even omitted. It is to be understood that in the specification and claims, reference to a "blowing agent" includes such gas generating agents, even though they serve to give the additional effect of curing.

These blowings agents may be compounded with the resinous material on a mill or in a Banbury mixer or in any other mixing equipment. The temperature of mixing must be kept below that value at which the blowing agent generates gas, and with the above agents it has been found that satisfactory mixing can be obtained at temperatures of from 140 to 200° F. The mixture is sheeted out and permitted to cool to a friable mass and is then broken up into solid granules of a desired size. For use in a last, granules of from $\frac{1}{16}$ of an inch to about $\frac{1}{4}$ of an inch have been found very satisfactory. For other uses the material may be reduced to a powder or may be used in even larger particle sizes.

The composition comprising the resinous material and the blowing agent is satisfactory for use in forming tough, strong articles; but for various purposes including improving the cold flow characteristics and/or reducing the cost of the material, there may be employed a filler such as lignin or mineral fillers including clay, channel black, calcium carbonate or other known mineral filler. A quantity of filler up to a weight approximating or even slightly exceeding the total weight of the resinous material and plasticizer may be employed. The filler will be incorporated in the resinous material by the same procedure and at the same time as or before incorporation of the blowing agent.

Figure 1:
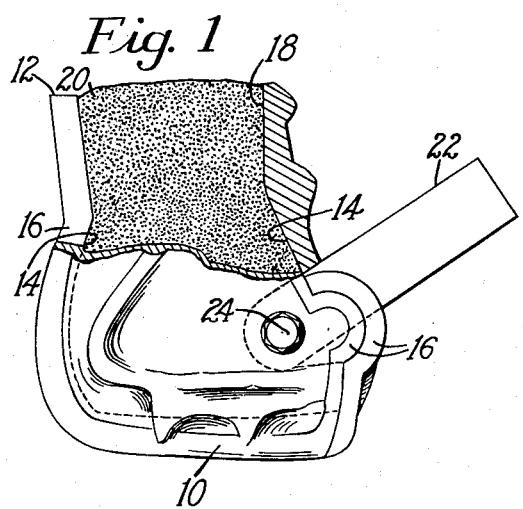
Fig. 1 is a partial sectional elevation of a mold for the heel part of a last filled with the new molding material according to the present invention.
Figure 2:
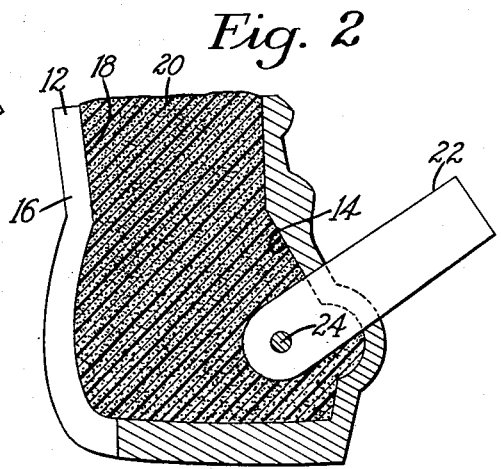
Fig. 2 is a sectional elevation of the mold with the molded material therein after treatment to convert the molding material into a hard, strong, cellular material.

A mold used in forming an article using the material of the present invention may comprise a simple two-part mold, shown in Figs. 1 and 2 as a mold for the heel part of a last. The parts 10 and 12 of the mold comprise shaped surface portions 14 and cooperating flange portions 16. A funnel shaped opening 18 is provided in the upper portion of the last mold for filling material into the mold after assembly of the two parts. A removable insert bar 22 projects into the mold through a slot in part 10 of the mold.

Figure 4:
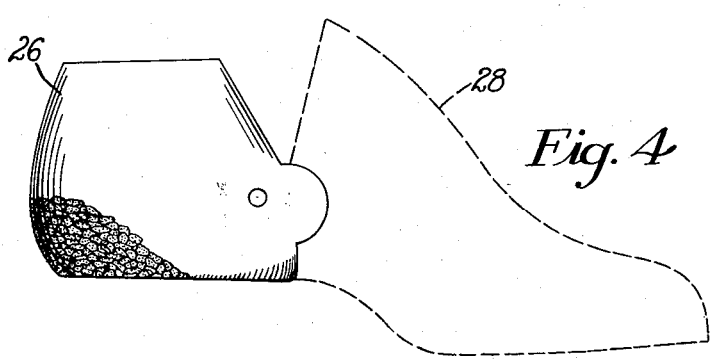

The inner end of the bar is fixed in position by a bolt 24 which extends through holes in the sides of the mold parts 10 and 12 and through a hole in the end of the bar 22. The bar 22 and bolt 24 mold a slot and hole in the heel part for receiving a hinge link and hinge pin respectively in assembling the heel part with a forepart of a last, as illustrated in Fig. 4.

The granules 20 containing a blowing agent are placed in the mold as shown in Fig. 1. The quantity of granules in the mold and hence the ultimate density of the molded article will depend on the size of the granules and the tightness with which they are packed. In general, larger granules tend to pack less tightly. By proper selection of size of particle and variation in the quantity of granules in the mold, specific gravities ranging from 0.1 to a value somewhat less than that of the resinous material have been obtained. For use in making last parts, specific gravities of from 0.7 to 0.9 have been found satisfactory. The filled mold is subjected to heat sufficient to soften particles and to cause them to expand under the action of the blowing agent. The expanded particles sinter together into an integral cellular mass which, due to the action of the blowing agent, is pressed into molding contact with the surfaces of the mold. The time of heating required will vary depending on the cross section of the mold, the temperature of heating, the nature of the material of the particles, the curing agent, and other factors known to the skilled chemist. With the heel part mold of Figs. 1 and 2 a heat treatment of approximately three hours at 135° C. has been found satisfactory to cause expansion and sintering of the granules and curing of material comprising a phenolic resin and a butadiene acrylonitrile copolymer synthetic rubber. The expanded sintered mass (see Fig. 2) is removed from the mold after curing and excess material is trimmed off to form the final molded article. In the present case a last heel part 26 is formed which may be used without further finishing operations in combination with a forepart 28, shown in broken lines in Fig. 4. The following examples are given to assist in understanding the invention. It is to be understood that the invention is not limited to the materials, proportions, or operational details disclosed in the examples.

Example 1

| | Parts by weight |
|---|---|
| Cashew nut-shell oil-phenol aldehyde resin (Durez resin 12687) | 300 |
| Butadiene acrylonitrile copolymer containing 33% acrylonitrile-Hycar OR25 | 100 |
| Dixie clay | 225 |
| Coumarone indene resin having a melting point of 75° C. (Piccoumaron 422R) | 20 |
| Diazoamine benzene (Unicel) | 7 |

The above materials were mixed on a Banbury mixer at a temperature which varied from 140° to 200° F. The mixture was sheeted out and permitted to cool to a friable condition. The cooled material was then broken up to a particle size comprising granules ranging from $\frac{1}{16}$ inch to $\frac{1}{4}$ inch. These granules were then poured into a heated lubricated mold similar to that shown in Figs. 1 and 2 at a temperature of 100° C. in quantity sufficient to completely fill the mold. The temperature of the mold was brought to 135° C. and maintained at that temperature for three hours. The mold and its contents were cooled and the mold removed from the molded article. The resulting molded last heel part conformed faithfully to the shape of the mold and after minor finishing operations was assembled with a last forepart as shown in Fig. 4 to form a last suitable for the lasting of shoes. The molded material had a specific gravity of 0.80.

Example 2

| | Parts by weight |
|---|---|
| Marbon S | 100 |
| Darex #3 | 160 |
| GRS–10 | 50 |
| Zno | 15.5 |
| Stearic acid | 31.1 |
| Sulfur | 7.9 |
| Piccoumaron 457 | 47 |
| Piccoumaron 452 | 47 |
| $NaHCO_3$ | 62 |
| Unicel | 47 |
| Santocure | 3.9 |

Marbon S is a copolymer of styrene and selected diolefins obtained from the Marbon Corporation, Gary, Indiana. Darex #3 is a copolymer of butadiene and styrene containing 70% styrene obtained from the Dewey & Almy Chemical Co. of Cambridge, Massachusetts. GRS–10 is a copolymer of butadiene and styrene containing 30% styrene. Piccoumaron 457 is a coumarone-indene resin having a melting point, ball and ring of 30° to 35° C.; and Piccoumaron 452 is a coumarone-indene resin having a melting point, ball and ring of 80° to 90° C. These Piccoumaron resins are obtained from the Pennsylvania Industrial Chemical Corp. of Clairton, Pennsylvania. Santocure (N-cyclohexyl-Z-benzothiazole sulfenamide) is a curing agent produced by the Monsanto Corporation of St. Louis, Missouri.

The above materials were mixed, sheeted out and granulated as in Example 1. The granules were poured into a hot mold similar to that shown in Figs. 1 and 2 at a temperature of 135° C. and were cured for three hours at 135° C. The mold was then cooled and the molded material removed. The resulting last heel part conformed faithfully to the contour of the mold surface and was found to be strong and resistant to fracture under the conditions encountered in its use in making shoes.

Example 3

| | |
|---|---|
| Geon Polyblend 500X329 _____ gms__ | 330 |
| Unicel _____ parts by weight__ | 15 |

Geon Polyblend is a mixture of 45% of Hycar OR and 55% of polyvinyl chloride obtained from the B. F. Goodrich Co. of Akron, Ohio.

The above materials were mixed, sheeted out and granulated as in Example 1. The granules were poured into a hot mold at a temperature of 135° C. for one hour. The mold was then cooled and the molded material removed from the mold. The resulting material was light, porous, and strong.

Example 4

| | Parts by weight |
|---|---|
| Marbon S | 140 |
| Neoprene GN | 60 |
| Silene | 80 |
| Unicel | 8 |
| Piccoumaron 422R | 40 |
| Sulfur | 4 |
| Altax | 6 |
| Zno | 20 |

Piccoumaron 422R is a coumarone-indene resin obtained from the Pennsylvania Industrial Chemical Corp. and has a melting point, ball and ring of 80° to 90° C.

The above materials were mixed, sheeted out, and granulated as in Example 1. A mold at a temperature of 135° C. was filled with the composition, and the mold and granules were heated for three hours at 135° C. The mold was then cooled and the molded material removed. The resulting composition was a strong, integral, expanded material having a specific gravity of 0.70 which can readily be turned on a lathe or otherwise worked with woodworking machinery.

Having described our invention, what we claim as new and desire to secure by Letters Patent of the United States is:

1. A light, strong, integral, continuous, cellular material comprising a network of relatively thick substantially nonporous resinous membranes defining cells and thinner membranes of the same composition as the network subdividing said cells into smaller units, said resinous material comprising an intimate mixture of from 100 to 300 parts by weight of a heat-softenable resin which is strong and rigid in set condition, and 100 parts by weight of a synthetic polymer rubber.

2. A light, strong, integral, continuous cellular material comprising a network of relatively thick substantially nonporous resinous membranes defining cells and thinner membranes of the same composition as the network subdividing said cells into smaller units, said resinous material comprising an intimate mixture of from 100 to 300 parts by weight of a heat-softenable resin which is strong and rigid in set condition, and 100 parts by weight of a copolymer synthetic rubber.

3. A light, strong, integral, continuous cellular material comprising a network of relatively thick substantially nonporous resinous membranes defining cells and thinner membranes of substantially the same composition as the network subdividing said cells into smaller units, said resinous material comprising the reaction product of a thermosetting phenol-aldehyde resin and a butadiene acrylonitrile copolymer containing at least 20% acrylonitrile.

4. A light, strong, integral, continuous cellular material comprising a network of relatively thick substantially nonporous resinous membranes defining cells and thinner membranes of the same composition as the network subdividing said cells into smaller units, said resinous material comprising the reaction product of a thermosetting phenol-aldehyde resin and a butadiene acrylonitrile copolymer containing at least 20% of acrylonitrile, said copolymer and the phenol-aldehyde resin being present in the ratio of from 100 to 300 parts of the resin with 100 parts of the copolymer.

5. A light, strong, integral, continuous cellular material comprising a network of relatively thick substantially nonporous resinous membranes defining cells and thinner membranes of substantially the same composition as the network subdividing said cells into smaller units, said resinous material comprising polymerized vinyl chloride and a butadiene acrylonitrile copolymer.

6. A light, strong, integral, continuous cellular material comprising a network of relatively thick substantially nonporous resinous membranes defining cells and thinner membranes of the same composition as the network subdividing said cells into smaller units, said resinous material comprising an intimate mixture of a styrene copolymer of high styrene content and a copolymer synthetic rubber.

7. A light, strong, integral, continuous cellular material comprising a network of relatively thick substantially nonporous resinous membranes defining cells and thinner membranes of the same composition as the network subdividing said cells into smaller units, said resinous material comprising an intimate mixture of a styrene copolymer of high styrene content and a butadiene-styrene copolymer synthetic rubber containing 30% styrene.

8. A process for forming a strong, light, cellular, integral material which comprises disposing in a confined space dense solid granules comprising a blowing agent and an intimate mixture of from 100 to 300 parts by weight of a heat-softenable resin which is strong and rigid in set condition and 100 parts by weight of a synthetic polymer rubber, said mixture being characterized by flow properties such that a mass of granules of the mixture free from a blowing agent would shrink in volume and flow together when softened by heat, said blowing agent being within the individual solid granules, and heating the granules to soften them and to cause the blowing agent to evolve gas, whereby the individual granules are expanded, the surfaces of the expanded granules are forced into contact with the surfaces of adjacent granules and the contacting surfaces are sintered together into a continuous network of relatively thick, substantially nonporous resinous membranes defining cells, the expanded resinous material of the interior of the granules forming thinner membranes subdividing said cells into smaller units.

9. A process for forming a strong, light, cellular, integral material which comprises disposing in a confined space dense, solid granules comprising a blowing agent and an intimate mixture of from 100 to 300 parts by weight of a heat-softenable resin which is strong and rigid in set condition and 100 parts by weight of a copolymer synthetic rubber, said mixture being characterized by flow properties such that a mass of granules of the mixture free from blowing agent would shrink in volume and flow together when softened by heat and said blowing agent being within the individual solid granules, and heating the granules to soften them and to cause the blowing agent to evolve gas, whereby the individual granules are expanded and the surfaces of the expanded granules are forced into contact with the surfaces of adjacent granules and the contacting surfaces are sintered together into a continuous network of relatively thick, substantially nonporous resinous membranes defining cells, the expanded resinous material of the interior of the granules forming thinner membranes subdividing said cells into smaller units.

10. A process for forming a strong, light, cellular, integral material which comprises disposing in a confined space dense, solid granules comprising a blowing agent and an intimate mixture of a butadiene-acrylonitrile copolymer containing at least 20% acrylonitrile and a thermosetting phenol aldehyde resin reactive therewith, said mixture being characterized by flow properties such that a mass of granules of the mixture free from blowing agent would shrink in volume and flow together when softened by heat and said blowing agent being within the individual solid granules, and heating the granules to soften them and to cause the blowing agent to evolve gas, whereby the individual granules are expanded and the surfaces of the expanded granules are forced into contact with the surfaces of adjacent granules and the contacting surfaces are sintered together into a continuous network of relatively thick, substantially non-porous resinous membranes defining cells, the expanded resinous material of the interior of the granules forming thinner membranes subdividing said cells into smaller units, and continuing heating to cure the resin.

11. A process for forming a strong, light, cellular integral material which comprises disposing in a confined space dense, solid granules comprising a blowing agent and an intimate mixture of a butadiene-acrylonitrile copolymer containing at least 20% acrylonitrile, and a thermosetting phenol aldehyde resin reactive therewith, said copolymer and the phenol aldehyde resin being present in the ratio of from 100 to 300 parts of the resin with 100 parts of the copolymer, said blowing agent being within the individual solid granules, and heating the granules to soften them and to cause the blowing agent to evolve gas whereby the individual granules are expanded and the surfaces of the expanded granules are forced into contact with the surfaces of adjacent granules and the contacting surfaces are sintered together into a continuous network of relatively thick, substantially non-porous resinous membranes defining cells, the expanded resinous material of the interior of the granules forming thinner membranes subdividing said cells into smaller units, and continuing heating to cure the resin.

12. A process for forming a strong, light, cellular, integral material which comprises disposing in a confined space dense, solid granules comprising a blowing agent and an intimate mixture of a resinous material comprising polymerized vinyl chloride and a butadiene-acrylonitrile copolymer said mixture being characterized by flow properties such that a mass of granules of the mixture free from blowing agent would shrink in volume and flow together when softened by heat and said blowing agent being within the individual solid granules, and heating the granules to soften them and to cause the blowing agent to evolve gas, whereby the individual granules are expanded and the surfaces of the expanded granules of the mixture free from blowing agent adjacent granules and the contacting surfaces are sintered together into a continuous network of relatively thick, substantially non-porous resinous membranes defining cells, the expanded resinous material of the interior of the granules forming thinner membranes subdividing said cells into smaller units, and continuing heating to cure the resin.

13. A process for forming a strong, light, cellular, integral material which comprises disposing in a confined space dense, solid granules comprising a blowing agent and an intimate mixture of a resinous material comprising a styrene copolymer of high styrene content and a copolymer synthetic rubber said mixture being characterized by flow properties such that a mass of granules of the mixture free from blowing agent would shrink in volume and flow together when softened by heat and said blowing agent being within the individual solid granules, and heating the granules to soften them and to cause the blowing agent to evolve gas, whereby the individual granules are expanded and the surfaces of the expanded granules are forced into contact with the surfaces of adjacent granules and the contacting surfaces are sintered together into a continuous network of relatively thick, substantially non-porous resinous membranes defining cells, the expanded resinous material of the interior of the granules forming thinner membranes subdividing said cells into smaller units, and continuing heating to cure the resin.

14. A process for forming a strong, light, cellular, integral material which comprises disposing in a confined space dense, solid granules comprising a blowing agent and an intimate mixture of a resinous material comprising a styrene copolymer of high styrene content and a butadiene styrene copolymer synthetic rubber containing 30% styrene said mixture being characterized by flow properties such that a mass of granules of the mixture free from blowing agent would shrink in volume and flow together when softened by heat and said blowing agent being within the individual solid granules, and heating the granules to soften them and to cause the blowing agent to evolve gas, whereby the individual granules are expanded and the surfaces of the expanded granules are forced into contact with the surfaces of adjacent granules and the contacting surfaces are sintered together into a continuous network of relatively thick, substantially non-porous resinous membranes defining cells, the expanded resinous material of the interior of the granules forming thinner membranes subdividing said cells into smaller units, and continuing heating to cure the resin.

15. A process for forming a strong, light, cellular article which comprises disposing between and in contact with fixed spaced surfaces dense, solid granules comprising an intimate mixture of from 100 to 300 parts by weight of a heat-softenable resin which is strong and rigid in set condition and 100 parts by weight of a synthetic polymer rubber, said blowing agent being within the individual solid granules, said mixture of resin and synthetic rubber being characterized by flow properties such that a mass of granules of the mixture free from a blowing agent would shrink in volume and flow together when softened by heat, heating the granules to cause the blowing agent to expand the individual granules to force the surfaces of the granules into continuous contact with the surfaces of adjacent granules and said fixed spaced surfaces, but not substantially to change the total volume occupied by the granules and to soften and sinter together the contacting surface portions of the granules into a continuous network of relatively thick, substantially nonporous, membranes defining cells, the expanded material of the interior of the granules forming thinner membranes, subdividing said cells into smaller units.

References Cited in the file of this patent

UNITED STATES PATENTS

| Number | Name | Date |
|---|---|---|
| 2,136,096 | Benner et al. | Nov. 8, 1938 |
| 2,183,857 | Turkington | Dec. 19, 1939 |
| 2,322,581 | Lytle | June 22, 1943 |
| 2,363,051 | Dosmann | Nov. 21, 1944 |
| 2,371,868 | Berg et al. | Mar. 20, 1945 |
| 2,459,739 | Groten et al. | Jan. 18, 1949 |